(12) United States Patent
Souza et al.

(10) Patent No.: US 11,584,579 B2
(45) Date of Patent: Feb. 21, 2023

(54) DISPLAY PACKAGING FOR MOUNTING ARTICLES

(71) Applicant: 3M INNOVATIVE PROPERTIES COMPANY, St. Paul, MN (US)

(72) Inventors: Julio M. Souza, São Paulo (BR); Felipe S. R. Bizarria, São Paulo (BR)

(73) Assignee: 3M Innovative Properties Company, St. Paul, MN (US)

( * ) Notice: Subject to any disclaimer, the term of this patent is extended or adjusted under 35 U.S.C. 154(b) by 249 days.

(21) Appl. No.: 16/757,205

(22) PCT Filed: Oct. 16, 2018

(86) PCT No.: PCT/IB2018/058025
§ 371 (c)(1),
(2) Date: Apr. 17, 2020

(87) PCT Pub. No.: WO2019/077501
PCT Pub. Date: Apr. 25, 2019

(65) Prior Publication Data
US 2021/0122549 A1    Apr. 29, 2021

Related U.S. Application Data

(60) Provisional application No. 62/573,504, filed on Oct. 17, 2017.

(51) Int. Cl.
*B65D 75/58*    (2006.01)
*B65D 75/36*    (2006.01)
*F16M 13/02*    (2006.01)

(52) U.S. Cl.
CPC .......... *B65D 75/585* (2013.01); *B65D 75/36* (2013.01); *F16M 13/02* (2013.01); *B65D 2201/00* (2013.01)

(58) Field of Classification Search
CPC ...... B65D 75/00; B65D 73/00; B65D 75/366; B65D 73/0064
(Continued)

(56) References Cited

U.S. PATENT DOCUMENTS 702,033 A * 6/1902 Scott .................... A47B 23/042
248/459
2,985,296 A * 5/1961 Kahn ................... B65D 75/366
206/470
(Continued)

FOREIGN PATENT DOCUMENTS

CN    201016786    2/2008
FR    2639432    5/1990
(Continued)

OTHER PUBLICATIONS

International Search Report for PCT International Application No. PCT/IB2018/058025, dated Jan. 4, 2019, 5 pages.

*Primary Examiner* — Steven A. Reynolds
*Assistant Examiner* — Prince Pal
(74) *Attorney, Agent, or Firm* — Ann K. Gallagher (57) ABSTRACT

Disclosed are display packages allowing consumers to quickly and easily determine whether a given mounting article should be used to hang or otherwise retain a desired object. The display packages include a projection designed to tear or otherwise separate from a backing once an object exceeding a recommended weight is mounted on the projection. If the projection remains attached to the backing, the mounting article is appropriate for the object. If the projection separates, another mounting article should be used.

13 Claims, 4 Drawing Sheets

(58) Field of Classification Search
USPC ....... 206/461, 463, 470, 464, 471; 211/70.6, 211/113, 124; 40/617
See application file for complete search history.

(56) References Cited

U.S. PATENT DOCUMENTS

| | | | | |
|---|---|---|---|---|
| 3,085,725 | A * | 4/1963 | Caparosa | A47G 25/743 206/487 |
| 3,246,747 | A * | 4/1966 | Blish | B65D 73/0092 206/469 |
| 3,592,343 | A * | 7/1971 | Swett | A47G 25/743 211/85.3 |
| D243,443 | S * | 2/1977 | Hayashi | D9/415 |
| 4,109,795 | A * | 8/1978 | Konigsford | A47F 5/0823 248/220.42 |
| 4,113,109 | A * | 9/1978 | Donnelli | B65D 77/22 211/49.1 |
| 4,179,029 | A * | 12/1979 | Fethke | B65D 75/366 206/349 |
| 4,219,140 | A * | 8/1980 | Simonoff | B65D 73/0071 206/294 |
| 4,423,811 | A * | 1/1984 | Knapp | B65D 43/162 220/4.23 |
| 4,437,432 | A * | 3/1984 | Immeyer | A01K 39/0106 426/805 |
| 4,456,124 | A * | 6/1984 | Kay | B65D 73/0057 206/463 |
| 4,634,005 | A * | 1/1987 | Kulzer | B65D 73/0064 206/349 |
| 4,729,473 | A * | 3/1988 | Kulzer | B65D 73/0064 206/480 |
| 4,739,883 | A * | 4/1988 | Mohs | B65D 73/00 206/467 |
| 4,930,267 | A | 6/1990 | Hill | |
| 5,020,669 | A * | 6/1991 | Nakagoshi | G03C 3/00 206/466 |
| 5,279,420 | A * | 1/1994 | Rodgers | B65D 73/0064 40/668 |
| 5,353,935 | A | 10/1994 | Yeager | |
| 5,375,725 | A * | 12/1994 | Rosenthal | A47F 5/0869 248/306 |
| 5,381,202 | A * | 1/1995 | Mizuno | B65D 73/0028 396/511 |
| 5,390,794 | A * | 2/1995 | Vulpitta | B65D 73/00 206/459.1 |
| 5,743,403 | A * | 4/1998 | Crysdale | B65D 73/0021 211/113 |
| D412,278 | S * | 7/1999 | Josephs | D9/722 |
| 5,988,373 | A * | 11/1999 | Yates | B65D 73/0064 40/664 |
| D419,064 | S * | 1/2000 | Gorry | D9/415 |
| 6,016,914 | A | 1/2000 | Gustafson | |
| 6,026,528 | A * | 2/2000 | Pina | A47D 15/00 5/503.1 |
| 6,155,414 | A | 12/2000 | Vaessen | |
| 6,375,005 | B1 * | 4/2002 | McCann | B65D 73/0064 206/349 |
| 6,571,953 | B2 | 6/2003 | Sherline | |
| 6,691,870 | B1 | 2/2004 | Palm | |
| 6,769,541 | B1 * | 8/2004 | Carriere | A47F 5/0043 206/820 |
| 6,834,767 | B1 * | 12/2004 | Lin | B65D 73/0007 206/349 |
| 6,898,880 | B2 * | 5/2005 | Best | G09F 3/02 40/299.01 |
| D519,364 | S * | 4/2006 | Kopp | D9/418 |
| 7,032,755 | B2 * | 4/2006 | Martins | A47F 5/0823 206/526 |
| 7,040,582 | B2 * | 5/2006 | Rosler | B65D 33/14 248/101 |
| 7,131,535 | B2 * | 11/2006 | Hernandez, Jr. | B65D 73/0064 206/483 |
| 7,188,762 | B2 * | 3/2007 | Goade, Sr. | G06K 19/06196 235/487 |
| 7,207,441 | B2 | 4/2007 | Ritter | |
| 7,219,829 | B2 * | 5/2007 | Treat | B42D 15/045 229/84 |
| D571,208 | S * | 6/2008 | Rozanski | D9/457 |
| 7,410,056 | B2 | 8/2008 | Cafferata | |
| 7,413,080 | B2 | 8/2008 | Van House | |
| 7,758,484 | B2 | 7/2010 | Peterson | |
| 7,841,470 | B2 * | 11/2010 | Chin | B65D 75/22 206/307 |
| 7,850,023 | B2 * | 12/2010 | Silveria | A47F 5/0025 248/220.21 |
| 8,322,529 | B2 * | 12/2012 | Titkos | B65D 73/0064 206/553 |
| 8,328,016 | B2 | 12/2012 | Thorton | |
| D684,862 | S | 6/2013 | DiFranza | |
| 8,684,182 | B2 | 4/2014 | Bailey | |
| D704,059 | S * | 5/2014 | Glass | D9/457 |
| D718,135 | S | 11/2014 | Harrison | |
| 9,585,496 | B2 * | 3/2017 | Strassburger | A47F 5/0006 |
| 10,059,497 | B2 * | 8/2018 | Rehberg | B65D 73/0064 |
| 11,160,406 | B2 * | 11/2021 | Strassburger | A47G 25/005 |
| 2003/0121817 | A1 * | 7/2003 | Hooper | A47G 25/005 206/461 |
| 2004/0099553 | A1 * | 5/2004 | Chen | B65D 73/00 206/349 |
| 2005/0092644 | A1 * | 5/2005 | Cafferata | A47F 1/128 206/806 |
| 2006/0042986 | A1 | 3/2006 | Simkowski | |
| 2006/0091037 | A1 | 5/2006 | Grote | |
| 2006/0097119 | A1 * | 5/2006 | Williamson | B65D 73/00 248/309.1 |
| 2006/0151350 | A1 | 7/2006 | Tilton | |
| 2007/0266605 | A1 * | 11/2007 | Halbur | G09F 1/00 40/674 |
| 2008/0283715 | A1 * | 11/2008 | Morrison | F16B 45/00 248/467 |
| 2011/0233097 | A1 | 9/2011 | Clark | |
| 2012/0031809 | A1 | 2/2012 | Methe | |
| 2012/0222990 | A1 | 9/2012 | Fujiwara | |
| 2013/0233751 | A1 * | 9/2013 | Hansen | B65D 73/0092 206/464 |
| 2014/0209497 | A1 * | 7/2014 | Jacobus | B65D 43/12 206/468 |
| 2015/0291331 | A1 * | 10/2015 | Bradford | B65D 75/368 206/705 |
| 2016/0031624 | A1 * | 2/2016 | Pascua | B32B 9/045 206/459.1 |
| 2020/0277117 | A1 * | 9/2020 | Vagnoni | B65D 73/0014 |

FOREIGN PATENT DOCUMENTS

| | | |
|---|---|---|
| FR | 2639432 A1 * | 5/1990 |
| GB | 2428807 | 2/2007 |
| WO | WO 2009-086949 | 7/2009 |

* cited by examiner

DISPLAY PACKAGING FOR MOUNTING ARTICLES

CROSS REFERENCE TO RELATED APPLICATIONS

This application is a national stage filing under 35 U.S.C. 371 of PCT/IB2018/058025, filed Oct. 16, 2018, which claims the benefit of provisional Application No. 62/573,504, filed Oct. 17, 2017, the disclosure of which is incorporated by reference in its/their entirety herein.

BACKGROUND

The revolutionary Command® Adhesive Strip products are a line of stretch removable adhesive strips that hold strongly on a variety of surfaces (including paint, wood, and tile) and that remove cleanly—no holes, marks, or sticky residue. These products generally have utility in bonding to various surfaces or substrates for numerous applications.

In general, these products include a stretch release adhesive composition disposed on tape or other backings. Stretch releasable adhesives are high performance pressure-sensitive adhesives that combine strong holding power with clean removal and no surface damage. Stretch releasable adhesive products are designed to firmly adhere an article, such as a hook or other mounting article (to hold a picture or an article of clothing) or other decorative or utilitarian element, to a surface (an adherend), yet remove cleanly when pulled away from the architectural surface at a low angle. The clean removal aspect means that a tacky and/or unsightly residue is not left behind on the surface after removal of the stretch release adhesive and that no damage to the surface occurs during the removal process. During the process of stretch release removal, the adhesive layer typically remains adhered to the tape backing as the backing is stretched, but releases from the surface (adherend).

Peelable adhesive technology has also been introduced for use in mounting articles. Some exemplary commercially available peelable mounting articles (e.g., Jimmy Hook™ products, GeckoTech™ products, Elmer's Freestyle™ products, and Hook Um™ products) rely on both suction technology and frictional or dry adhesives to generate the mounting article's holding power. The mounting articles include a semi-rigid plastic backing and a rigid hook, both of which are integrated as a one-piece article support. The rigid hook is permanently attached to a first major planar surface of the semi-rigid plastic backing. The second major planar surface of the backing can be adhered to a wall surface. The second major planar surface includes one or more of suction technology (e.g., numerous microsuction or nanosuction elements) and/or a frictional adhesive (in which the backing is impregnated with a rubber-based adhesive to increase friction between the substrate and backing) or dry adhesive (which relies on van der Waals forces). The entire construction can, thereafter, be removed by peeling.

Mounting articles of the types described above are commonly sold in blister packs. The standard blister pack includes a clear plastic bubble or "blister" attached to a backing card. This type of package gives a consumer a clear view of the contents of the package, is economical to produce, and is easy to load, close and ship. Blister packs are particularly well-adapted for containing several small products in one package. Exemplary blister packs are described in U.S. Pat. No. 4,930,267 (Borst), U.S. Pat. No. 5,353,935 (Yeager et al.), U.S. Pat. No. 6,016,914 (Gustafson), U.S. Pat. No. 6,571,953 (Sherline et al.), U.S. Pat. No. 7,207,441 (Ritter), U.S. Pat. No. 8,328,016 (Thorton et al.), U.S. Pat. No. 8,684,182 (Bailey) and US Publication Nos. 20060091037 (Grote et al.).

Whether the packaged mounting article relies on stretch release or peel release for removal, the related blister pack commonly includes a printed maximum weight recommendation for objects that ought to be mounted with the mounting article. This so-called package weight claim is designed to alert consumers to the expected performance of the mounting article. Moreover, the package weight claim is intended to help the consumer avoid unnecessary damage to both possessions and wall surfaces.

SUMMARY

Though a variety of mounting articles exist and provide myriad options for mounting objects of disparate weights, it is often challenging for a consumer to select the appropriate mounting article for a given object. While many mounting articles are displayed in packages with a printed maximum weight recommendation, the consumer is often left to speculate on the weight of the object to be mounted and may need to test multiple mounting articles before success. This testing can result in wasted time, as well as potential damage to wall surfaces if the mounting article fails.

The inventors of the present disclosure realized that consumers needed a convenient way to test the suitability of a mounting article for any object to be mounted. The display packages of the present disclosure allow consumers to quickly and easily determine whether a given mounting article should be used to hang or otherwise secure a desired object. The display packages include a projection designed to tear or otherwise separate from a backing once an object exceeding a recommended weight is mounted on the projection. Accordingly, the display packaging of the present disclosure provides a clear, unmistakable confirmation that the consumer is selecting the right product.

In one aspect, the present disclosure provides a package for displaying a mounting article, the package including: a backing card having a front face, a back face, and two side edges; a projection extending outwardly from the side edge; wherein at least one of the front face and back face includes printed instructions for a maximum holding weight of a mounting article; and a line of weakness extending between the projection and the backing, wherein the line of weakness is adapted to fail when an object having a weight greater than the printed instruction is hung on a surface of the projection.

In another aspect, the present disclosure provides a method of determining the suitability of a mounting article to mount an object, the method comprising: providing the object; providing a package, the package including a backing card having a front face, a back face, and two side edges; a projection extending outwardly from the side edge, wherein at least one of the front face and back face includes printed instructions for a maximum holding weight of a mounting article; and a line of weakness extending between the projection and the backing, wherein the line of weakness is adapted to fail when an object having a weight greater than the printed instruction is hung on a surface of the projection; and hanging the object from the projection.

In another aspect, the present disclosure provides a system of packages for displaying a series of mounting article, the system including: a first package and a second package, each package including, a backing card having a front face, a back face, and two side edges; a projection extending outwardly from the side edge; and a line of weakness extending between the projection and the backing, wherein the amount of force necessary to cause the line of weakness to fail is greater for the first package than the second package.

As used herein, "layer" means a single stratum that may be continuous or discontinuous over a surface.

As used herein, the terms, "height", "depth", "top" and "bottom" are for illustrative purposes only, and do not necessarily define the orientation or the relationship between the surface and the intrusive feature. Accordingly, the terms "height" and "depth", as well as "top" and "bottom" should be considered interchangeable.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As recited herein, all numbers should be considered modified by the term "about".

As used herein, "a," "an," "the," "at least one," and "one or more" are used interchangeably. Thus, for example, a backing card comprising "a" projection can be interpreted as a backing card comprising "one or more" projections.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation. It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The display packages of the present disclosure allow consumers to quickly and easily determine whether a given mounting article should be used to hang or otherwise secure a desired object. The display packages include a projection designed to tear or otherwise separate from a backing once an object exceeding a recommended weight is mounted on the projection. If the projection remains attached to the backing, the mounting article is appropriate for the given object. If the projection separates, then another mounting article should be sought. Accordingly, the display packaging of the present disclosure provides a clear, unmistakable confirmation that the consumer is selecting the right product.

Figure 1:
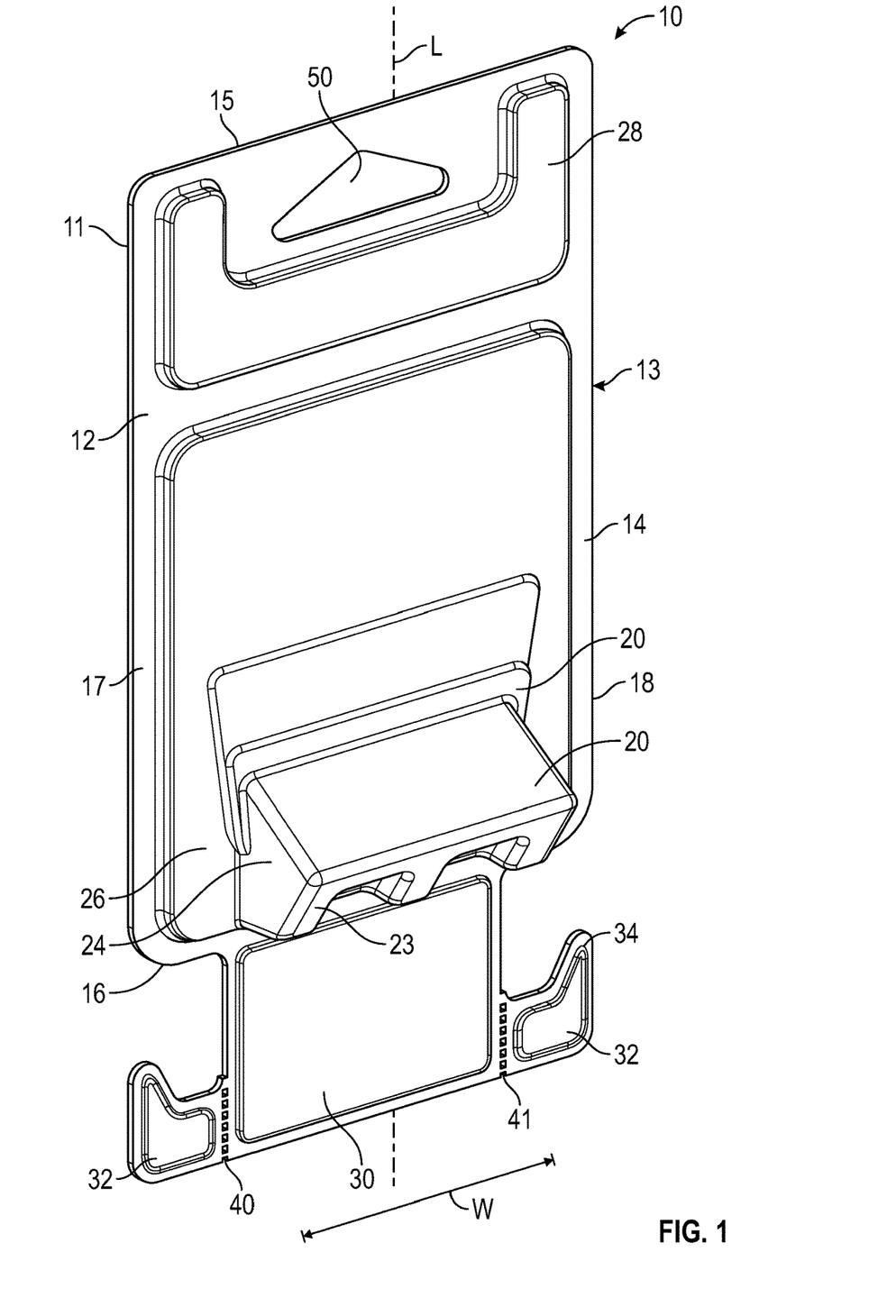
FIG. 1 is a perspective view of one embodiment of a display package of the type generally described herein.
Figure 2:
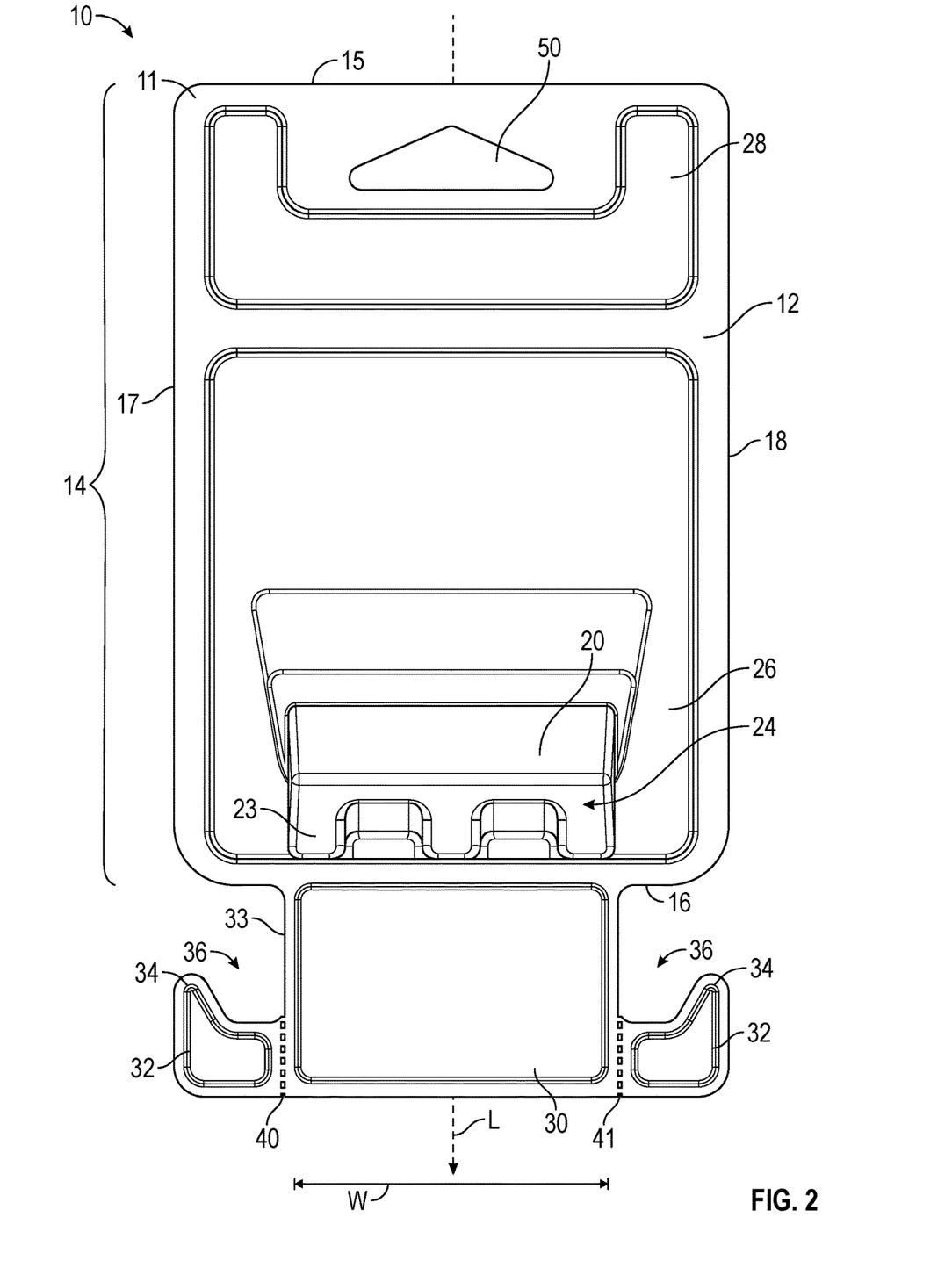
FIG. 2 is a front view of the package of FIG. 2.

The package 10 is assembled from a blister 20 and a backing card 11. The backing card 11 includes a front surface 12 facing the blister 20 and an opposing, back surface 13. The backing card 11 includes a main body 14 generally defined by an upper edge 15, lower edge 16, and generally parallel side edges 17 and 18. As depicted in FIGS. 1 and 2, the main body 14 of backing card 12 is generally rectangular. The shape of the main body 14 is not particularly limited, however, and can include any suitable shape or combination of shapes. Typically, however, the shape includes at least one straight edge.

The blister 20 includes a forwardly extending bubble 22 which defines, with the front surface 12 of backing card 11, a container cavity 24 configured to retain the mounting articles (not shown) to be displayed within the package 10. The bubble 22 extends forwardly from a peripheral front flange 26. The flange 26 extends outwardly from the bubble 22 in the direction of the main body 14 perimeter and is attached to the backing card 11 at a plurality of locations. The flange 26 may be secured to the backing card 11 in essentially any suitable matter (e.g., radiation sealed, adhered, laminated, etc.)

The bubble 22 and container cavity 24 can be any desired size and shape depending on the device(s) to be packaged or any other design or aesthetic considerations. The number of cavities may also vary from application to application, as desired. For example, a single blister may be formed with a plurality of discrete cavities, where each portion is configured to package a separate article or a separate collection of articles. As depicted, the outer surface 23 of the bubble 22 mimics the contour of a plurality of mounting articles (not shown).

Indicia, ornamental features, source information, instructions for use, or any other desired information for communication to a consumer may be provided on the either surface 12, 13 of the backing card 11. In typical embodiments, at least one of the surfaces includes a printed recommendation of the maximum weight of objects that can be mounted by the devices retained in the cavity 24 (i.e., a package weight claim). A laminate layer 28 may also be provided to seal the backing card 11. The backing card 11 may further include a hanging aperture 50 adjacent the upper edge 15, so that the package 10 may be hung on a peg or other display rack for presentation to consumers.

The backing card 11 may be made of any suitable material. The backing card 11 may be made of biodegradable or recyclable material. For example, the backing card 11 may include cardboard backing, a resin-based member, or other conventional packaging support. The cardboard may be made from paper board. The backing card 11 may be made from, or partially include, resin materials, as described below.

The blister 20 may be made of any suitable material. The blister 20 may be made, for example, of a thermoplastic resin material or combination of resin materials. The blister 20 may be thermoformed, injection molded, or made from any other process known in the art. Non-limiting examples of plastic or thermoplastic resin materials from which the blister 20 may be made may include polyethylene, polyvinyl chloride, polypropylene, polystyrene, polyamide, polyacrylamide, polymethylacrylate and polyethylene terephthalate. Non-limiting examples of biodegradable resin materials suitable for use in the blister may include aliphatic polyesters, modified polyvinyl alcohol, cellulose ester compounds, and modified starch.

It may be beneficial to have the blister 20 at least partially transparent or translucent to allow for ready viewing of the article(s) by a consumer. In other embodiments, however, the blister 20 may also be opaque or partially opaque.

The laminate layer 28 may be formed from the same resin materials as blister 20. In one embodiment, the laminate layer 28 includes the same resin or combination of resins as blister 20. In such embodiments, the laminate layer 28 and a least a portion of the blister 20 may be integral. In another embodiment, the materials forming the laminate layer 28 and blister 20 are different. The laminate layer 28 extends over at least a portion of the front surface 12 of the backing card 11, and in some embodiments substantially all of the front surface 12.

The blister 20 may be affixed, detachably or otherwise, to the backing card 11 by any mechanism available in the art. For example, the blister 20 may be heat-sealed or glued to the backing card 11. The peripheral flange 26 may be useful in securing the blister 20 to the backing card 11, as noted above. The flange 26 and/or the laminate layer 28 may be joined, for example, by heat seal, to attach the backing card 11 to the blister 20. In other embodiments, the flange 26 may be secured between two layers or portions of the backing card 11, as exemplified in U.S. Pat. No. 8,684,182 (Bailey).

The backing card 11 further includes a mounting flange 30. The mounting flange 30 extends downward from the lower edge 16 of the main body 14, such that it is disposed below the bubble 22. The mounting flange 30 has a reduced width "W" as compared to the main body 14 of the backing card 12. In other embodiments, the width of the flange may be equal to or greater than the width of the main body. For the depicted embodiment, however, the reduced width provides additional space for testing objects, as described below.

A pair of projections 32 extend outwardly from the sides 33 of the mounting flange 30 in a direction generally parallel to lower edge 16. The projections 32 are substantially coplanar with the mounting flange 30. Alternatively, the projection(s) may extend in a direction generally orthogonal to the front surface of the mounting flange 30, or any other suitable angle. In other embodiments (not shown), the projections may extend outwardly from a side edge of the main body 14, such that the package 10 lacks a mounting flange 30.

The projections 32 in the depicted embodiment are hooks having an arcuate leg 34 and a defined recess 36 between the leg 34, a side edge 33, and the lower edge 16. The projections 32 may take on any shape, however, so long as they extend outwardly from the backing card and provide a ledge or other surface on which an object may be retained (e.g., hung).

First and second lines of weakness 40, 41 extend between each the projection 32 and the mounting flange 30. Therefore, each projection 32 may be detached from the card body along the line of weakness 40, 41. In the depicted embodiment, each line of weakness 40, 41 is aligned with the long axis "L" of the backing card 11. Each line of weakness 40, 41 may comprise at least one of a perforation or set of perforations, a thinned portion, at least one shaped recess, and other configurations known in the art. The lines of weakness 40, 41 may be provided with a single line of weakness as depicted, or can include a plurality of lines of weakness. If perforations are used, the perforations may be shaped in accordance with any of the accepted perforation patterns including linear, angled, Y-shaped, V-shaped, dual-angled offset, sinusoidal, etc. The lines of weakness 40, 41 may for example comprise a hole or slit, or several holes or slits extending through at least one, or all of the layers of the backing card material. If used, such holes preferably extend between the front and back surfaces of the card 11. A thinned portion may be an indentation in a layer(s) of the backing card 11. A thinned portion typically locally reduces the thickness dimension between the major surfaces 12, 13 of the backing card 11. The lines of weakness 40, 41 may be continuous and provided by a single continuous feature, or discontinuous and provided by a multiplicity of features acting in combination.

Figure 3:
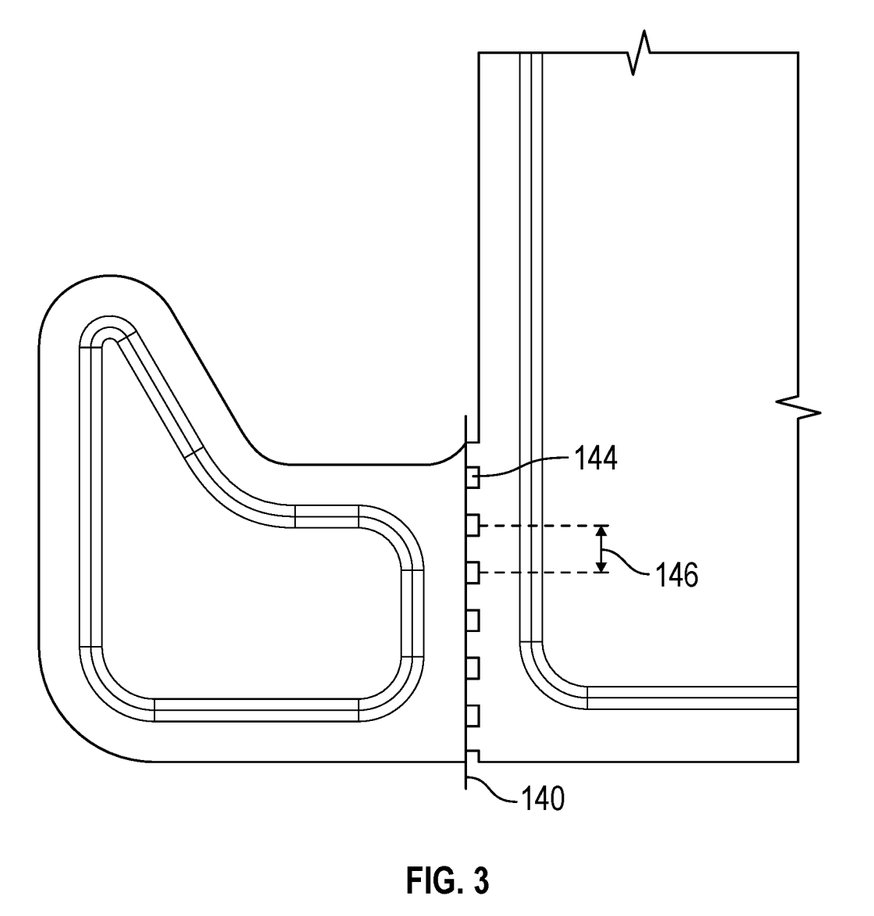
FIG. 3 is a front view of one embodiment of an exemplary projection and line of weakness for use with the packages described herein.

The lines of weakness 40, 41 can be designed to fail once an object exceeding a specified weight is hung or otherwise placed on the projection 32. When the weight is greater than the package weight claim indicated on the backing card 11 the line of weakness 40 will tear, showing a consumer that the object is heavier than recommended. In one example depicted in FIG. 3, the line of weakness 140 includes a series of perforations 144 spaced from one another on a defined pitch 146. Varying at least one of the length of the perforation, the depth of the perforation, and the pitch between adjacent perforations can result in a change to maximum weight before failure (i.e., failure weight). For instance, the line of weakness 140 is designed to fail once an object exceeding 225 grams/m$^2$ is hung from the projection 132 and includes a total perforation length of 21.9 mm and a pitch of 6 mm.

Figure 4A:
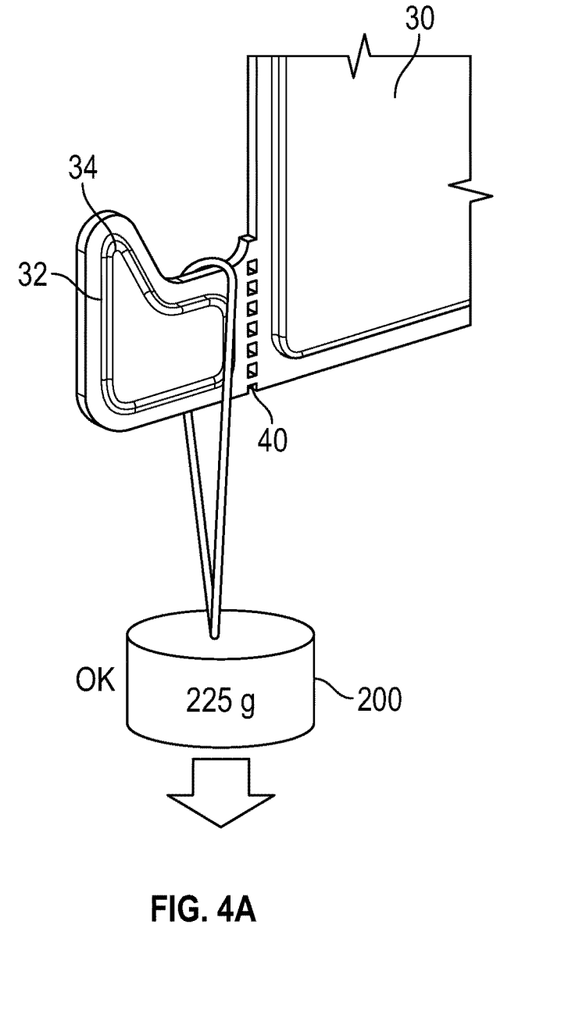
FIG. 4A is an illustration of a line of weakness maintaining its integrity when an object meeting a package weight claim is hung on a projection.
Figure 4B:
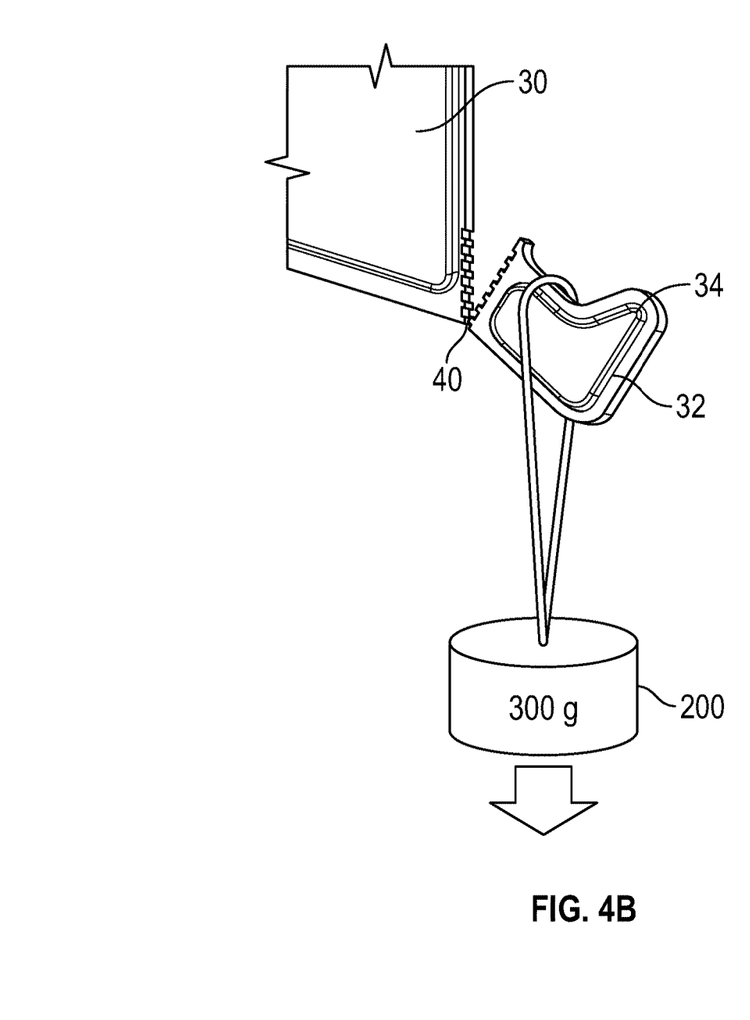
FIG. 4B is an illustration of the failure of a line of weakness during or after an object having a weight exceeding a package weight claim is hung on the projection.

Put another way, the projection 32 will stay attached to the mounting flange 30 so long as an object hung from the projection 32 does not exceed the failure weight of a line of weakness 40, 41. Accordingly, the mounting flange 30 provides a user with a simple check to determine the appropriate mounting article for a given object. The effect can be seen in FIGS. 4A and 4B: the lack of separation in FIG. 4A is indicative of a suitable article for the object 200, while the failure in FIG. 4B suggests to the consumer that the object 200 is simply too heavy for the packaged mounting article.

The mounting flange 30 may further include a cleft at the upper bound of at least one line of weakness 40, 41 between the projection 32 and the side edge 33. The cleft offers a starting point for the line of weakness 40, 41 to fail, beginning to detach the projection from the edge of the mounting flange 30. The cleft can help ensure the propagation of the detachment force through the line of weakness 40 once the failure weight is exceeded.

The laminate layer 28 extends over at least a portion of the front surface 13 of the both the mounting flange 30 and the projections 32. It presently preferred implementations, the laminate layer 28 does not extend over either line of weakness 40, 41. The presence of the laminate layer 28 on the projection can guard against material failure, ensuring that any detachment or deformation occurs at the line of weakness 40 and not the body of the projection 32.

It will be appreciated that in some embodiments the design of line of weakness 40 can differ from that of line of weakness 41. Thus, for example, line of weakness 40 may be designed to more easily initiate and/or propagate a tear, in comparison to line of weakness 41. For example, line of weakness 40 may be a continuous recess, while line of weakness 41 might be a discontinuous series of perforations spaced at a greater pitch. Such approaches, while still enabling tearing along a line of weakness to be performed when desired, might provide for multiple package weight claims to be tested. This may be useful, for example, in order to allow package and display multiple mounting articles having one or more different package weight claims or for a system of display cards, as described below.

The failure weight testing concepts described herein may also be used without including a blister on the front surface of a backing card. In one example, a series of testing cards is provided including a first card a second card, and a third card. Each card includes a backing card, at least one projection extending outwardly from the backing card, and a line of weakness between the projection and the backing card. Each card may include a different package weight claim, and the line of weakness for any one card in the series may possess a different failure weight than any other card in the series. In this way, the consumer can compare the suitability for hanging a given object amongst a suite of mounting articles. It will be appreciated that such a system may also work with each of the cards includes one or more mounting articles retained in a blister.

In some embodiments, the actual object desired to be mounted is directly hung from the projection. This can be accomplished using features of the object. Alternatively, a string or other implement can be secured to the object to assist in hanging. In yet another alternative, the consumer is provided with various weights that represent common objects (e.g., picture frames, clocks, lights, etc.).

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

We claim:

1. A package for displaying a mounting article, the package including:
    a backing card having a front face, a back face, and two side edges;
    a projection extending outwardly from the side edge;
    wherein at least one of the front face and back face includes printed instructions for a maximum holding weight of the mounting article; and
    a line of weakness extending between the projection and the backing, wherein the line of weakness is adapted to fail when an object having a weight greater than the printed instruction is hung on a surface of the projection.

2. The package of claim 1, and further comprising a polymeric blister disposed opposite the front face, the blister and the front face cooperating to define a cavity.

3. The package of claim 2, wherein a mounting article is retained in the cavity.

4. The package of claim 1, wherein the projection is integral with the backing card.

5. The package of claim 1, wherein the projection is coplanar with the backing card.

6. The package of claim 1, and further including a reinforcing material extending over at least a portion of the backing card and the hook.

7. The package of claim 5, wherein the reinforcing material does not extend over the line of weakness.

8. The package of claim 1, wherein the line of weakness includes a series of perforations.

9. The package of claim 1, wherein failure at the line of weakness at least partially separates the projection from the backing card.

10. The package of claim 1, wherein the projection comprises a hook.

11. The package of claim 1, wherein the projection comprises a ledge.

12. A method of determining the suitability of a mounting article to mount an object, the method comprising:
    providing the object;
    providing a package, the package including a backing card having a front face, a back face, and two side edges; a projection extending outwardly from the side edge, wherein at least one of the front face and back face includes printed instructions for a maximum holding weight of a mounting article; and a line of weakness extending between the projection and the backing, wherein the line of weakness is adapted to fail when an object having a weight greater than the printed instruction is hung on a surface of the projection;
    hanging the object from the projection.

13. The method of claim 12, and further comprising determining whether the mounting article is suitable for mounting the object by examining the line of weakness.

\* \* \* \* \*